US009826027B2

(12) United States Patent
Doerr et al.

(10) Patent No.: US 9,826,027 B2
(45) Date of Patent: Nov. 21, 2017

(54) USER INTERFACES GENERATED BY A WORKFLOW ENGINE

(71) Applicant: Bank of America Corporation, Charlotte, NC (US)

(72) Inventors: Anthony J. Doerr, Downingtown, PA (US); Bradley M. Panchura, Abingdon, MD (US); Vinoth Sridharan, Wilmington, DE (US); David R. Chmielewski, Charlotte, MI (US); Jeremy J. Helm, Marlton, NJ (US); Joseph W. McLean, Clayton, DE (US)

(73) Assignee: Bank of America Corporation, Charlotte, NC (US)

( * ) Notice: Subject to any disclaimer, the term of this patent is extended or adjusted under 35 U.S.C. 154(b) by 394 days.

(21) Appl. No.: 14/463,387

(22) Filed: Aug. 19, 2014

(65) Prior Publication Data
US 2016/0055126 A1 Feb. 25, 2016

(51) Int. Cl.
*G06F 9/44* (2006.01)
*H04L 29/08* (2006.01)
*G06Q 10/10* (2012.01)

(52) U.S. Cl.
CPC ............ *H04L 67/10* (2013.01); *G06F 8/38* (2013.01); *G06Q 10/10* (2013.01)

(58) Field of Classification Search
CPC ............ G06F 3/04842; G06F 3/04847; G06F 17/30864; G06F 19/327; G06F 8/38; G06Q 10/10; G06Q 10/06; H04L 67/10
See application file for complete search history.

(56) References Cited

U.S. PATENT DOCUMENTS

| | | | | |
|---|---|---|---|---|
| 6,061,516 A | * | 5/2000 | Yoshikawa | G06F 9/4443 717/109 |
| 6,175,864 B1 | * | 1/2001 | Addison | G06F 9/45512 707/999.103 |
| 6,580,440 B1 | * | 6/2003 | Wagner | G06F 9/4443 715/762 |
| 6,621,505 B1 | * | 9/2003 | Beauchamp | G06Q 10/10 715/700 |
| 6,990,636 B2 | | 1/2006 | Beauchamp et al. | |
| 8,468,213 B2 | | 6/2013 | Kamata et al. | |
| 8,479,096 B2 | | 7/2013 | Terada et al. | |

(Continued)

*Primary Examiner* — Tadeese Hailu
(74) *Attorney, Agent, or Firm* — Michael A. Springs

(57) ABSTRACT

According to one embodiment of the present disclosure, a first processor with a store of application rules and a second processor communicably coupled to the first processor. The second processor generates a request for a next user application screen. The request comprises a current application screen identifier and user data. The second processor transmits the request for the user application screen to the first processor. The first processor receives the request for the next user application screen and determines dynamically, based on the current application screen identifier, the user data, and the plurality of application rules, user interface contents of the next user application screen. The first processor formats a response describing the user interface contents of the next user application screen and transmits the response to the second processor. The second processor receives the response and renders the next user application screen.

18 Claims, 7 Drawing Sheets

(56) References Cited

U.S. PATENT DOCUMENTS

| | | | |
|---|---|---|---|
| 8,543,932 B2 | 9/2013 | Fields et al. | |
| 2004/0205630 A1* | 10/2004 | Parks | G06F 17/30554 715/273 |
| 2005/0155027 A1* | 7/2005 | Wei | G06F 8/44 717/162 |
| 2005/0267913 A1* | 12/2005 | Stienhans | G06F 8/38 |
| 2005/0275758 A1* | 12/2005 | McEvilly | H04N 7/17318 348/725 |
| 2006/0064313 A1* | 3/2006 | Steinbarth | G06Q 10/10 705/322 |
| 2006/0200748 A1* | 9/2006 | Shenfield | G06F 8/70 715/239 |
| 2007/0150618 A1* | 6/2007 | Yoshida | G06Q 10/10 709/246 |
| 2009/0240553 A1* | 9/2009 | Sato | G06Q 10/0633 705/7.27 |
| 2010/0050153 A1* | 2/2010 | Louie | G06F 8/20 717/111 |
| 2010/0153447 A1* | 6/2010 | Johnson | G06Q 30/06 707/770 |
| 2010/0191882 A1* | 7/2010 | Zhu | G06Q 10/10 710/105 |
| 2010/0251132 A1* | 9/2010 | Nishino | G06F 8/38 715/743 |
| 2011/0083083 A1* | 4/2011 | Kurumai | G06F 17/30905 715/744 |
| 2011/0088011 A1* | 4/2011 | Ouali | G06F 8/10 717/105 |
| 2011/0113008 A1* | 5/2011 | Jafri | G06F 17/30867 707/608 |
| 2011/0265020 A1* | 10/2011 | Fields | G06Q 10/06 715/760 |
| 2012/0102414 A1* | 4/2012 | Demant | G06F 17/3089 715/753 |
| 2013/0080579 A1* | 3/2013 | Gordon | H04L 65/608 709/217 |
| 2013/0124254 A1* | 5/2013 | Jafri | G06Q 10/06316 705/7.26 |
| 2013/0137499 A1* | 5/2013 | Ito | A63F 13/00 463/17 |
| 2014/0143763 A1* | 5/2014 | Bhargava | G06F 8/20 717/139 |
| 2014/0244348 A1* | 8/2014 | Zamani | G06Q 30/0201 705/7.29 |
| 2015/0160928 A1* | 6/2015 | Hermanns | G06F 8/20 717/105 |

* cited by examiner

USER INTERFACES GENERATED BY A WORKFLOW ENGINE

TECHNICAL FIELD

This disclosure relates generally to user interfaces, and more particularly to user interfaces generated by a workflow engine.

BACKGROUND

Across an organization, multiple front end user interface systems may interact with an organization's back end systems. For example, in a claims processing system, customer service representatives may use a front end interface for processing claims. Supervisors may use a different front end interface for monitoring claims and investigators may use yet another front end interface for reporting findings. The three different front end systems may all interact with the same back end system. Frequently, the front end user interface may also incorporate application business logic. For example, an application business rule may dictate that after a claim is created the claim may enter an investigation stage. Thus, a front end user interface may incorporate logic to display an investigation user interface screen after a claim creation user interface screen. Changes in application business rules, however, can result in changes to the content and ordering of the front end user interfaces. If the application business rule changes, for example, to dictate that claims first enter a pre-investigation state, then all the front end user interfaces will need to be modified to include a new pre-investigation screen and include new content related to the pre-investigation state. Thus, changes to application business rules have a ripple effect across multiple front end systems. Different groups within an organization bear responsibility for developing or managing each front end system. Such tight coupling of user interface and application business logic often results in complicated change management procedures and increased application deployment times.

SUMMARY OF EXAMPLE EMBODIMENTS

In accordance with the present disclosure, disadvantages and problems associated with tight coupling of user interface and application business logic may be reduced or eliminated.

According to one embodiment of the present disclosure, a system comprises a memory operable to store a plurality of application rules, a first processor communicably coupled to the memory, and a second processor communicably coupled to the first processor. The second processor is operable to generate a request for a next user application screen. The request comprises a current application screen identifier and user data. The second processor is also operable to transmit the request for the user application screen to the first processor. The first processor is operable to receive the request for the next user application screen and determine dynamically, based on the current application screen identifier, the user data, and the plurality of application rules, user interface contents of the next user application screen. The first processor formats a response describing the user interface contents of the next user application screen and transmits the response to the second processor. The second processor is further operable to receive the response and render the next user application screen on a display.

Certain embodiments of the present disclosure may provide one or more technical advantages. For example, decoupling a user interface from application business rules enables a developer to create front end systems that are application business rule agnostic and thus focus on the presentation of data. Front end systems that are application business rule agnostic conserve development resources because changes to application business rules may not require changes to each front end system. A technical advantage of one embodiment includes reducing an amount of computing resources used for front end systems because the front end user interfaces do not contain application business logic. Application business logic may be consolidated in the back end system instead of duplicated across multiple front end systems.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Embodiments of the present disclosure and its advantages are best understood by referring to FIGS. 1-4C, like numerals being used for like and corresponding parts of the various drawings.

Decoupling a user interface from application business rules may be accomplished through an Application Programming Interface (API) that includes a screen descriptor meta language (SDML). The API enables multiple user interface systems (e.g., web, mobile, desktop, etc.), regardless of technology, to leverage the application business rules stored in a workflow engine. The API enables front end systems to be business rule agnostic and to instead focus only on the presentation of data. In some embodiments, the API may assist front end systems to step through a particular workflow in a sequential manner as dictated by application business rules present in a workflow engine. Such an API may prevent "logic splay" whereby business logic is distributed among many contributors and is difficult to change and maintain.

The API includes a GetNextScreen method. This method enables a client application to submit user data associated with a current step in a workflow while also requesting information for a next step in the workflow. The repetitive use of GetNextScreen enables the client application to leverage application business rules stored in a workflow engine without any knowledge of the underlying business processes. The client application is thus insulated from changes to the application business rules. The GetNextScreen method uses SDML to describe contents of a user interface screen to the client application and to receive information submitted from the client application. In general terms, a client application calls GetNextScreen, parses the SDML, renders the screen described by the SDML, presents the screen to a user, gathers user input data from the screen, formats the gathered data into SDML, and returns the SDML results via another call to GetNextScreen. This sequence is repeated until the workflow is complete. To parse the SDML and render a user interface screen, the client application need only support a small group of common screen components (e.g., checkbox, radio button, list, etc.) which may be referred to as screen controls and are described in more detail below.

Figure 1:
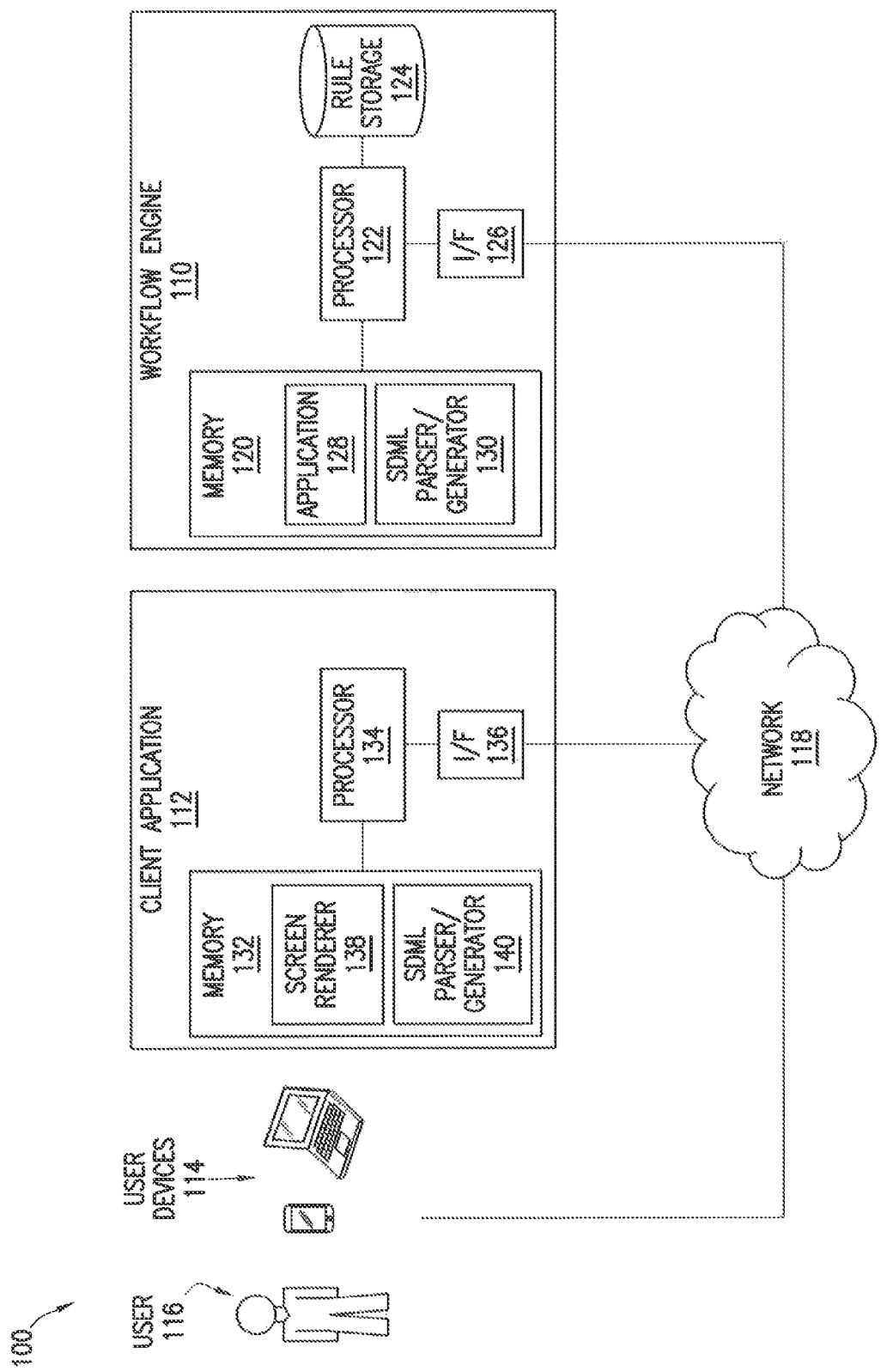
FIG. 1 illustrates a block diagram of an example system for rendering user interface components based on a screen description generated by a workflow engine, according to a particular embodiment.
Figure 2A:
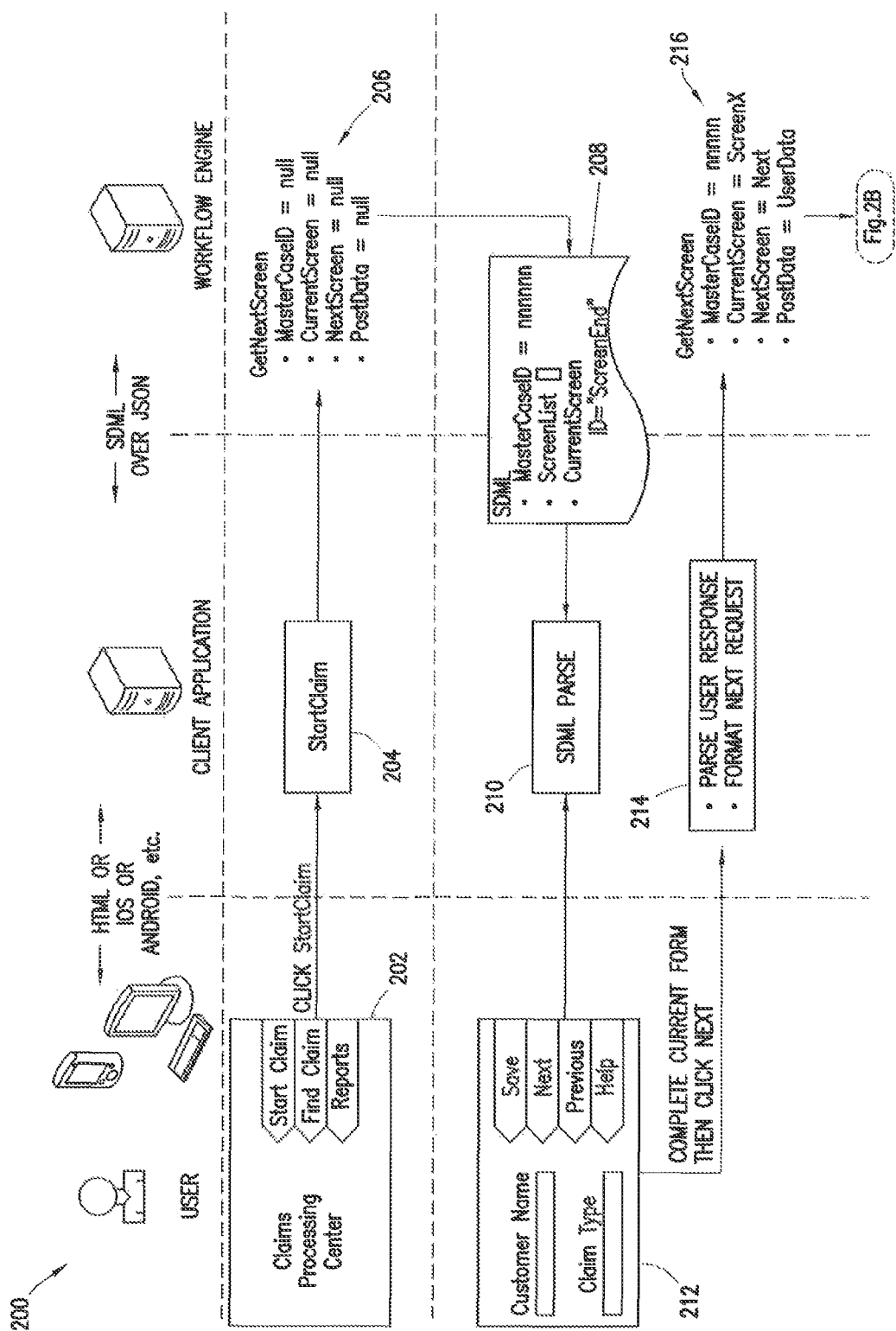
FIGS. 2A, 2B, 2C, and 2D illustrate a flowchart of an example workflow, according to a particular embodiment.
Figure 2B:
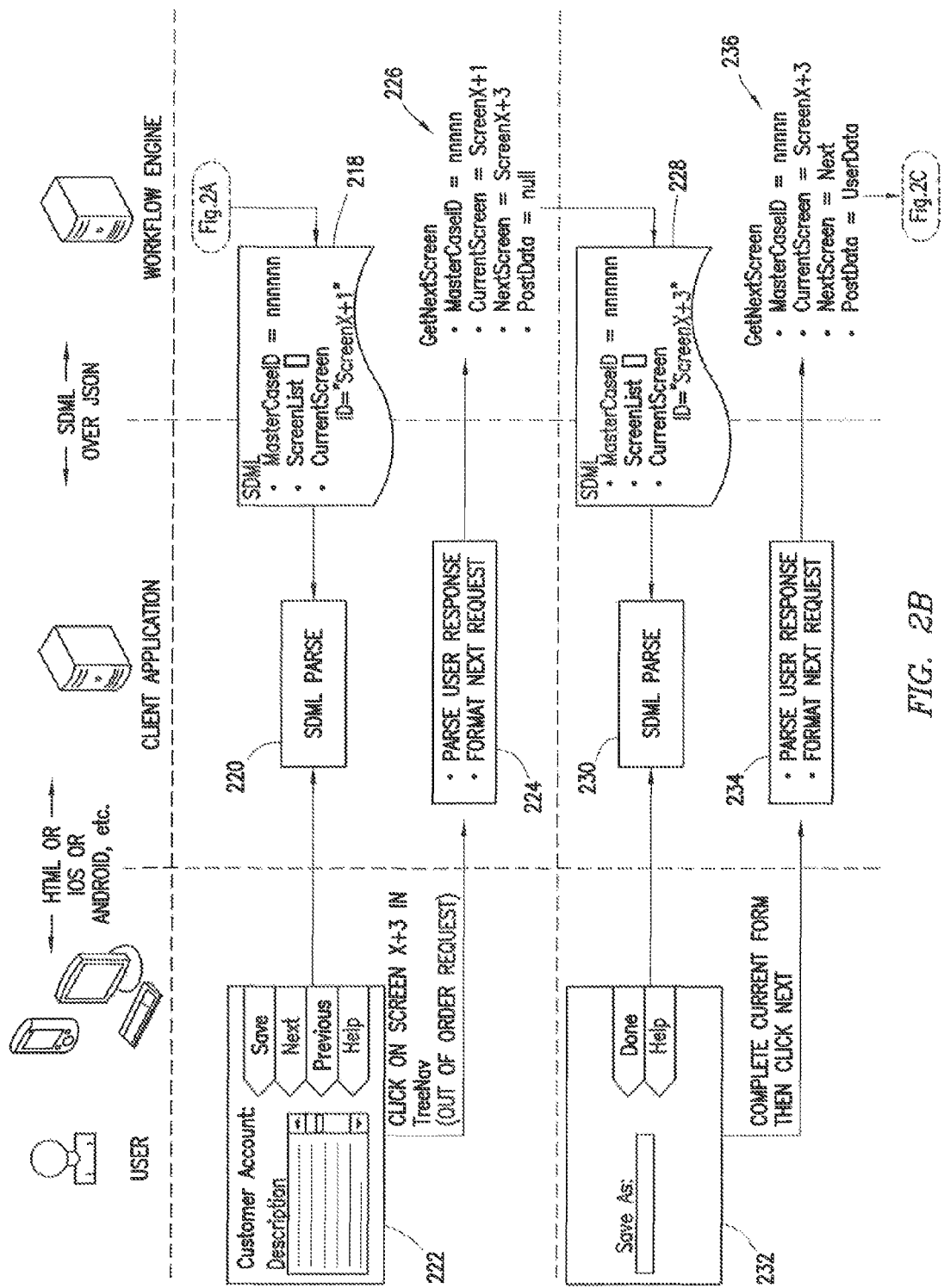
Figure 2C:
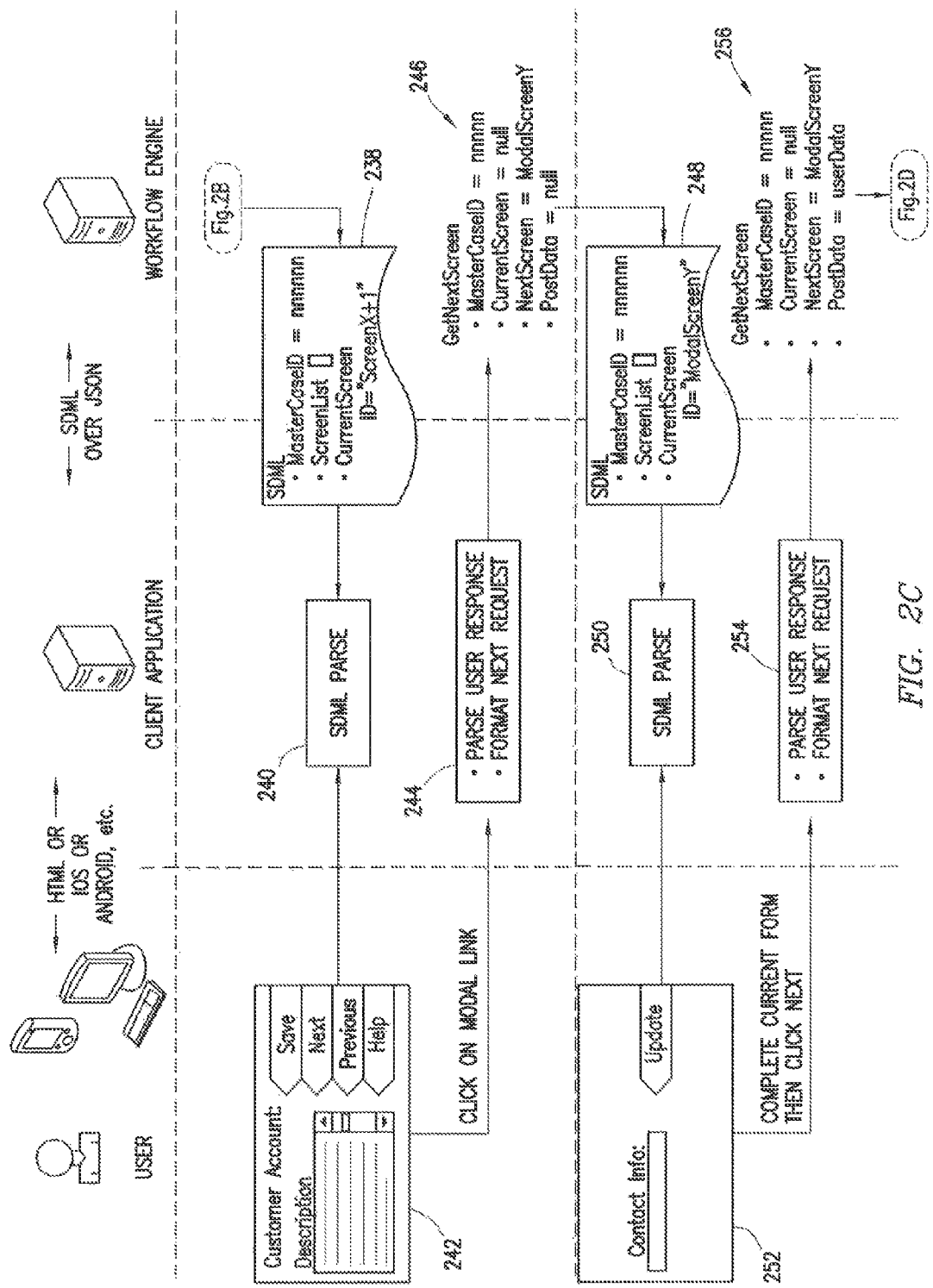
Figure 2D:
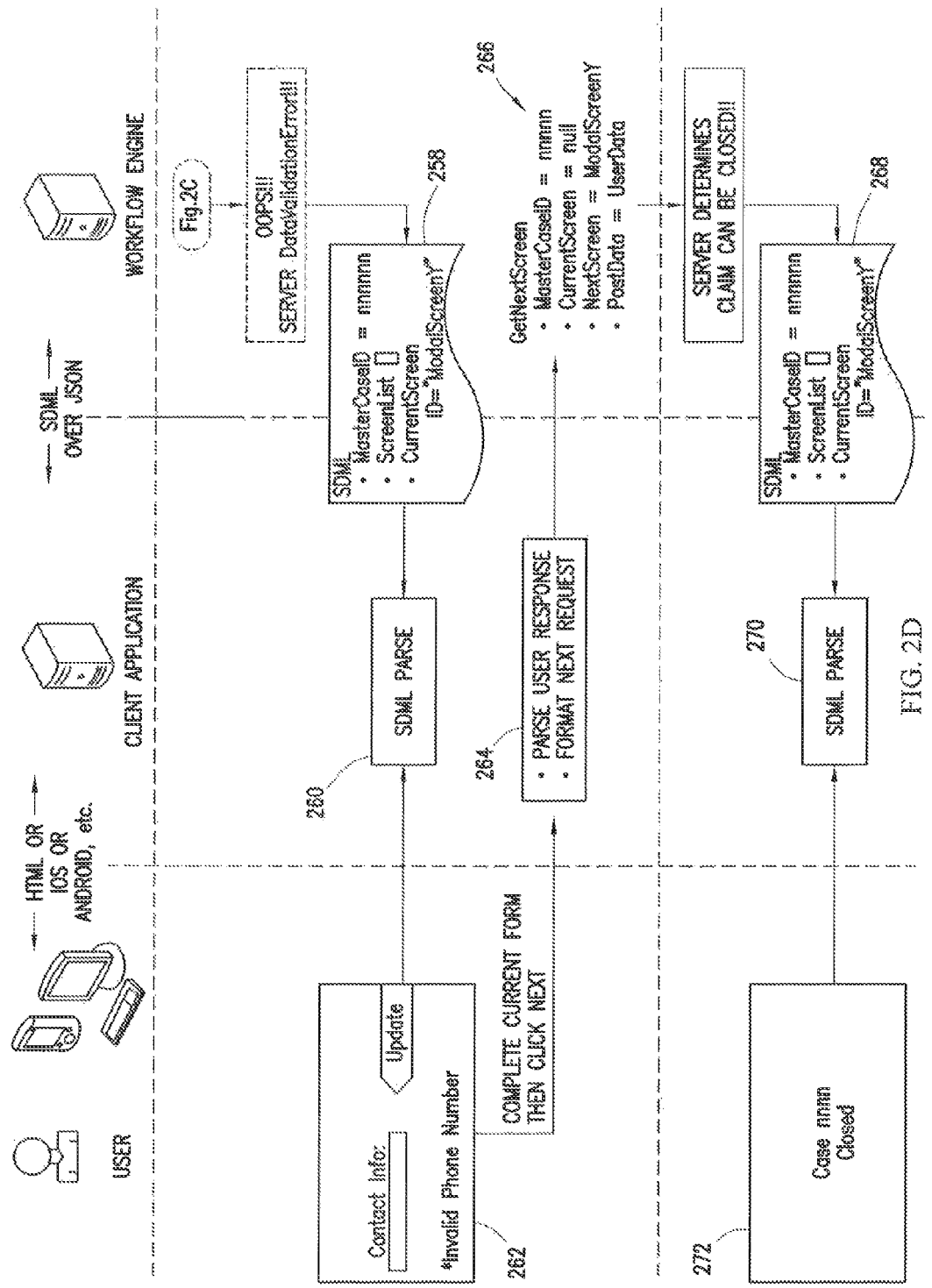

FIG. 1 illustrates an example block diagram of a system 100 for rendering user interface components based on a screen description generated by a workflow engine, according to a particular embodiment. System 100 may include workflow engine 110, one or more client applications 112, and one or more user devices 114 associated with one or more users 116. Network 118 may communicably couple workflow engine 110, client applications 112, and user devices 114. In general, client application 112 provides a user interface for user 116 to perform a particular workflow supported by workflow engine 110.

Workflow engine 110 may refer to any back end system for performing a particular workflow and may include memory 120, processor 122, rule storage 124, and interface 126. In some embodiments, workflow engine 110 may refer to any suitable combination of hardware and/or software implemented in one or more modules to process data and provide the described functions and operations. In some embodiments, the functions and operations described herein may be performed by a pool of workflow engines 110. In general, workflow engine 110 sends/receives information associated with a workflow to/from client application 112.

Workflow engine 110 contains the application business logic associated with a particular workflow. In some embodiments, the application business logic associated with a particular workflow is maintained as one or more business logic rules stored in rule storage 124. In some embodiments, processor 122 executes business application logic stored in memory 120. An advantage of workflow engine 110 is that application business logic may be stored in a format that can be understood by a business analyst. In some embodiments, a business analyst may manage the application business rules independently from client applications 112. Managing application business rules outside of client applications 112 may enable an organization to more quickly and easily modify a workflow without involving application programmers. Managing a store of application business rules in a central location may also facilitate regulatory compliance through simplified auditing of application business rules.

As a particular example, a banking organization may implement a fraud claims processing workflow using workflow engine 110. In particular embodiments, rule storage 124 may include application business rules related to tasks such as initiating claims, assigning claims, investigating claims, approving claims, and reimbursing claims. Rule storage 124 may include application business rules for complying with regulatory restrictions, which may vary by geographic location. Rule storage 124 may include business application rules for setting thresholds that trigger fraud alerts. When business rules, regulatory restrictions, or fraud detection methods change, a business analyst may quickly update workflow engine 110 to reflect the changes.

Memory 120 may refer to any suitable device capable of storing and facilitating retrieval of data and/or instructions. Examples of memory 120 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Although FIG. 1 illustrates memory 120 as internal to workflow engine 110, memory 120 may be internal or external to workflow engine 110, depending on particular implementations. Also, memory 120 may be separate from or integral to other memory devices to achieve any suitable arrangement of memory devices for use in system 100.

Memory 120 is generally operable to store one or more business applications 128 and SDML parser/generator 130. Business application 128 generally refers to logic, rules, algorithms, code, tables, and/or other suitable instructions for performing a particular business workflow. In some embodiments, business application 128 may perform a particular workflow based on application business rules stored in rule storage 124. In some embodiments, business application 128 may facilitate a claims processing workflow such as the banking organization's claims processing workflow example described above. In particular embodiments, business application 128 may facilitate any workflow applicable to an organization's business. Business application 128 may process requests from client application 112. Business application 128 may receive requests from, and send responses to, client application 112 via SDML parser/generator 130.

SDML parser/generator 130 generally refers to logic, rules, algorithms, code, tables, and/or other suitable instructions for parsing and/or generating SDML data. In some embodiments, SDML parser/generator 130 receives messages containing SDML data from client application 112. SDML data from client application 112 may include application data input from user 116. In an example credit fraud claims processing application, application data input from user 116 may include information about the customer reporting the fraud, customer account information, transaction information related to the fraudulent transaction, etc. The SDML data may also describe a user interface action performed by user 116. For example, the SDML data may indicate user 116 clicked a "next screen" button or clicked an "update contact information" button. Examples of particular SDML data structures will be described in more detail below. In particular embodiments, SDML parser/generator 130 may parse the received data and communicate the information to business application 128.

In some embodiments, business application 128 communicates information to SDML parser/generator 130. SDML parser/generator 130 may use the communicated information to generate SDML data and send a message containing the SDML data to client application 112. In particular embodiments, the SDML data may describe components of a user interface display. For example, the SDML data may describe a screen layout comprising text labels, checkboxes, radio buttons, lists, or any suitable user interface component. Examples of particular SDML screen controls will be described in more detail below.

In particular embodiments, SDML messages may be communicated over hypertext transfer protocol (HTTP). In particular embodiments, SDML messages may be communicated over any suitable protocol between workflow engine 110 and client application 112.

Processor 122 is communicably coupled to memory 120. Processor 122 is generally operable to execute business application 128 stored in memory 120 to perform a particular business workflow. Processor 122 may comprise any suitable combination of hardware and software to execute instructions and manipulate data to perform the described functions for workflow engine 110. In some embodiments, processor 122 may include, for example, one or more computers, one or more central processing units (CPUs), one or more microprocessors, one or more applications, and/or other logic.

Rule storage 124 is communicably coupled to processor 122. In some embodiments, rule storage 124 may refer to any suitable device capable of storing and facilitating retrieval of data and/or instructions, such as application business rules. Examples of rule storage 124 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Rule storage 124 may store any business application rules utilized by workflow engine 110.

In some embodiments, interface 126 (I/F) is communicably coupled to processor 122 and may refer to any suitable device operable to receive input for workflow engine 110, send output from workflow engine 110, perform suitable processing of the input or output or both, communicate to other devices, or any combination of the preceding. Interface 126 may include appropriate hardware (e.g. modem, network interface card, etc.) and software, including protocol conversion and data processing capabilities, to communicate through network 118 or other communication system that allows workflow engine 110 to communicate to other components of system 100. Interface 126 may include any suitable software operable to access data from various devices such as user devices 114, client application 112, and/or workflow engine 110. Interface 126 may include any suitable software operable to transmit data to various devices such as user devices 114, client application 112, and/or workflow engine 110. Interface 126 may include one or more ports, conversion software, or both. In general, interface 126 communicates SDML messages between client application 112 and workflow engine 110.

Client application 112 may refer to any front end system for performing a particular workflow and may include memory 132, processor 134, and interface 136. In some embodiments, client application 112 may refer to any suitable combination of hardware and/or software implemented in one or more modules to process data and provide the described functions and operations. Although only one client application 112 is illustrated in FIG. 1, particular embodiments may include any number of client applications 112. In general, client application 112 provides a front end interface for users 116 to interact with a back end system such as workflow engine 110. Client application 112 sends/receives information associated with a workflow to/from users 116 on the front end and to/from workflow engine 110 on the back end.

As a particular example, client application 112 may comprise a front end fraud claims processing application for use by user 116, such as a bank claims representative. In particular embodiments, a claims representative may use client application 112 to perform tasks such as initiating claims, assigning claims, approving claims, and reimbursing claims.

Memory 132 may refer to any suitable device capable of storing and facilitating retrieval of data and/or instructions, similar to memory 120 described above. Although FIG. 1 illustrates memory 132 as internal to client application 112, memory 132 may be internal or external to client application 112, depending on particular implementations. Also, memory 132 may be separate from or integral to other memory devices to achieve any suitable arrangement of memory devices for use in system 100. Memory 132 is generally operable to store screen renderer 138 and SDML parser/generator 140.

Screen renderer 138 generally refers to logic, rules, algorithms, code, tables, and/or other suitable instructions for rendering a user interface screen. In some embodiments, screen renderer 138 may be operable to render user interface screens for native display on a Windows or OS X workstation, for native display on an Android or IOS mobile device, for display within a browser, or for display on any suitable device using any suitable user interface package. In some embodiments, screen render 138 may receive input from SDML parser/generator 140.

SDML parser/generator 140 generally refers to logic, rules, algorithms, code, tables, and/or other suitable instructions for parsing and/or generating SDML data. In some embodiments, SDML parser/generator 140 receives messages containing SDML data from workflow engine 110. SDML data from workflow engine 110 may include application data for display to user 116. In an example credit fraud claims processing application, application data for display to user 116 may include information about the customer reporting the fraud, customer account information, transaction information related to the fraudulent transaction, etc. The SDML data may also describe user interface components for display to user 116. For example, the SDML data may indicate a navigation portion of a user interface screen should include a "next screen" and a "previous screen" button. In particular embodiments, the SDML data may describe a screen layout comprising text labels, checkboxes, radio buttons, lists, or any suitable user interface component. Examples of particular SDML data structures will be described in more detail below. In particular embodiments, SDML parser/generator 140 may parse the received SDML data and communicate the screen display information to screen renderer 138.

In some embodiments, screen renderer 138 communicates information to SDML, parser/generator 130. SDML parser/generator 130 may use the communicated information to generate SDML data and send a message containing the SDML data to workflow engine 110. In particular embodiments, the SDML data may contain data input from user 116 via a user interface display of user device 114. For example, the SDML data may include data related to initiating a new claim entered by a claims representative.

Processor 134 is communicably coupled to memory 132. Processor 134 is generally operable to execute a workflow associated with client application 112 by executing components such as screen renderer 138 and SDML, parser/generator 140 stored in memory 132. Processor 122 may comprise any suitable combination of hardware and software to execute instructions and manipulate data to perform the described functions for client application 112. In some embodiments, processor 122 may include, for example, one or more computers, one or more central processing units (CPUs), one or more microprocessors, one or more applications, and/or other logic.

In some embodiments, interface 136 (I/F) is communicably coupled to processor 134 and may refer to any suitable device operable to receive input for client application 112, send output from client application 112, perform suitable processing of the input or output or both, communicate to other devices, or any combination of the preceding. Interface 136 may include appropriate hardware and software as described above in reference to interface 126. In general, interface 136 communicates SDML messages between client application 112 and workflow engine 110.

User devices 114 may refer to any devices that enable users 116 to interact with client application 112. In some embodiments, user device 114 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. User device 114 may also comprise any suitable user interface such as a display, microphone, keyboard, or any other appropriate terminal equipment usable by user 116. System 100 may comprise any number and combination of user devices 114. User 116 may use user device 114 to interact with client application 112 to perform a business application workflow.

In some embodiments, user 116 may be an employee of an organization or a financial institution. As an example, a bank's claim representative may use user device 114 to initiate a claim on behalf of a bank customer. In some embodiments, user 116 may be a consumer or someone external to an organization.

In some embodiments, user device 114 may include a graphical user interface (GUI). The GUI is generally operable to tailor and filter data entered by and presented to user 116. The GUI may provide user 116 with an efficient and user-friendly presentation of screens associated with a business application workflow. The GUI may comprise a plurality of displays having interactive fields, pull-down lists, and buttons operated by user 116. The GUI may include multiple levels of abstraction including groupings and boundaries. The term GUI may be used in the singular or in the plural to describe one or more GUIs and each of the displays of a particular GUI.

In certain embodiments, network 118 may refer to any interconnecting system capable of transmitting audio, video, signals, data, messages, or any combination of the preceding. Network 118 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Although workflow engine 110, client application 112, and user device 114 are illustrated in FIG. 1 as separate components of system 100 connected by network 118, particular embodiments may integrate some components. For example, in particular embodiments client application 112 may be integrated with workflow engine 110. As a particular example, client application 112 may comprise a web server hosted by workflow engine 110. In particular embodiments, client application 112 may be integrated with user device 114. For example, client application 112 may comprise a mobile app executable on mobile user device 114.

In operation, user 116 interacts with client application 112 via a user interface displayed on user device 114 to perform a particular business application workflow. In particular embodiments, client application 112 is operable to render the user interface screens for user device 114. In particular embodiments, client application 112 does not contain business application logic. Workflow engine 110 contains application business logic specific to the particular workflow. Client application 112 communicates with workflow engine 110 to perform operations that depend on application business logic.

Certain advantages described above may be realized by isolating application business logic from multiple client applications 112. In traditional user interfaces, application business logic may be embedded, even unintentionally, in a front end user interface. For example, in a claims processing workflow application the front end user interface may be coded to display a claim investigation screen immediately after creation of a claim. A business analyst may determine a new pre-investigation claim state may be beneficial. Even if updated application business logic reflects the new pre-investigation claim state, the traditional front end user interface is still coded to display the old investigation screen. An advantage of particular embodiments disclosed herein is that the content and the ordering of user interface screens may be determined by application business logic through the use of an API and SDML.

The API enables multiple user interface systems (e.g., web, mobile, desktop, etc.), regardless of technology, to leverage the application business rules stored in workflow engine 110. The API enables client application 112 to be business rule agnostic and to instead focus only on the presentation of data. In some embodiments, the API may enable client application 112 to step through a particular workflow in a sequential manner as dictated by application business rules present in a workflow engine 110. The API includes a GetNextScreen method. This method enables client application 112 to submit user data associated with a current step in a workflow while also requesting information for a next step in the workflow. The repetitive use of (GetNextScreen enables client application 112 to leverage application business rules stored in a workflow engine 110 without any knowledge of the underlying business processes.

In general, the GetNextScreen method uses SDML to describe contents of a user interface screen to client application 112 and to receive information submitted from client application 112. In particular embodiments, client application 112 may invoke the GetNextScreen API of workflow engine 110, SDML parser/generator 130 may parse the contents of the GetNextScreen Request, application 128 may determine the next screen based on business application rules stored in rule storage 124, SDML parser/generator 130 may generate a GetNextScreen Response, workflow engine 110 may send the GetNextScreen Response to client application 112, SDML parser/generator 140 may parse the SDML data, screen renderer 138 may render the screen described by the SDML and present the screen to user 116 on user device 114, client application 112 may gather data input from user 116 via the screen on user device 114, SDML parser/generator 140 may format the gathered data into SDML, and client application 112 may return the SDML results to workflow engine 110 via another call to GetNextScreen. This sequence may be repeated until the workflow is complete.

In this disclosure, examples of SDML will be described in terms of Java Script Object Notation (JSON). In particular embodiments, SDML may be implemented using Extensible Markup Language (XML) or any other language suitable for describing user interface components. In particular embodiments, client application 112 may request a new/next user interface screen through repeated calls to GetNextScreen using SDML as the payload. The response payload will also be in SDML format.

For purposes of this disclosure, a "request" will refer to the payload sent from client application 112 to workload engine 110. In particular embodiments, client application 112 may use a GetNextScreen Request to (a) return values/data to workload engine 110 from a current client application user interface screen; (b) request the "next" screen in the workflow; (c) request a specific, possibly out-of-order, screen if permitted by the application business rules; and (d) request a "modal" screen that is available at any point in the workflow (often out-of-order and tangential to the workflow).

In particular embodiments, an example GetNextScreen Request to workflow engine 110 may be represented by the following SDML schema.

```
{
  "GetNextScreen":{
    // Common Request Header Block Start
    "MasterCaseID": "1990000001",  // empty when starting new case
    "InteractionID": "838383838",  // unique identifier of this call
    "OperatorID": "OPER001",
    "ClientID": "Client001",
    "Language": "English",
    "Audience": "Associate",  // "Associate" or "Customer"
    "CurrentScreen": "",      // Name of current step/screen
    "NextScreen": "PCR",      // Next or specific screen name
    // Common Request Reader Block End
    "PostData": [ ]           // response data returned from current screen
  }
}
```

The "PostData" array element in the above example GetNextScreen Request may contain result data from the "current" screen that was input by user 116.

In particular embodiments, client application 112 may start a workflow and repeatedly call the GetNextScreen method to step through the workflow. In some embodiments, client application 112 may (a) jump forward or backward to a particular screen (if allowed by the application business rules); or (b) request an optional (modal) supplemental screen. Such behavior may be supported through the "CurrentScreen" and "NextScreen" elements. The table below illustrates behavior associated with example combinations of "CurrentScreen" and "NextScreen" values.

| CurrentScreen | NextScreen | Request |
|---|---|---|
| Null | Null | Request new workflow, initial screen, and MasterCaseId. |
| Null | Screen_N | Request modal screen N. |
| Screen_N | Next | Request next screen N + 1 based on business application rules. |
| Screen_N | Screen_X | Request modal Screen X. |

For purposes of this disclosure, a "response" will refer to the payload sent from workload engine 110 to client application 112. In particular embodiments, workload engine 110 may use a GetNextScreen Response to (a) return the first screen in the workflow; (b) return the next screen in the workflow as determined by the application business rules; (c) return a specific screen requested by client application 112; (d) return the current screen with an error message; or (e) return a confirmation, such as confirming a particular action is complete.

In particular embodiments, client application 112 may use GetNextScreen for both submitting user data as well as requesting the next screen. If the submitted user data fails validation, workflow engine 110 may not allow navigation to the next screen. Instead, workflow engine 110 may return the current screen along with an error message.

In particular embodiments, an example GetNextScreen Response from workflow engine 110 may be represented by the following SDML schema.

```
{
  "MasterCaseID": "1990000001",  // used once in process
  "InteractionID": "838383838",  // unique identifier of this call
  "ScreenList" :
  [
    // Array of screens with which to populate navigation tree
  ],
  "CurrentScreen": {
    "Actions": [
      // Array of local actions or modal behaviors
    ],
    "Navigation": [
      // Array of navigation actions (e.g., Next, Submit, Cancel)
    ],
    "Sections": [
      // Array of sections. Each section may have attributes and a controls array
      {
        "ID" : "Section_1",
        "visible" : true,
        "Controls" : [
          // Array of controls
        ]
      },
      {
        "ID" : " Section_2",
        "visible" : true,
        "Controls" : [
          // Array of controls
        ]
      }
    ]
  }
}
```

In particular embodiments, "Actions" encapsulate application behaviors that can be considered outside the normal workflow. For example, a workflow may include ten steps to be completed in order. In particular embodiments, user 116 may be able to change a contact phone number at any time. Such capability may be displayed as a link or button on a screen to "Update Contact Info". The capability may be represented as the following example "Actions" array.

```
[
  { "ID" : "ContactInfo", "value" : "ContactInfoScreenId" } //
  a button or link to a suspect screen
  { "ID" : "PCR", "value" : "PCRScreenId" } // a button or link
  to a pcr screen
]
```

In particular embodiments, "Navigation" encapsulates application behaviors that can be considered within the normal workflow. For example, a workflow may include ten steps to be completed in order. Navigation controls may enable user 116 to select a next step in a workflow, or navigate between steps. In some embodiments, navigation controls may enable user 116 to navigate to other screens outside the normal workflow. In particular embodiments, "Navigation" may be represented by the following example array.

```
[
    { "ID" : "Previous", "value" : "Previous", "type" : "submit" },
        // a navigation button or link for Previous Screen
    { "ID" : "Next", "value" : "Next", "type" : "submit" } // a
    navigation button or link for Next Screen
]
```

In particular embodiments, user interface screens may comprise multiple "Sections." Sections may encapsulate single logical blocks of visible screen entities. In particular embodiments, sections may comprise one or more controls, such as data input/output controls and navigation controls, among others. In particular embodiments, sections may be represented by the following example array.

```
"Sections" : [
    {           // NOTES SECTION OF PAGE
        "ID" : "Notes",
        "Label" : "Notes",
        "collapsible" : true,
        "enabled" : true,
        "visible" : true,
        "readonly" : false,
        "required" : false,
        "Controls" : [
            // list of controls for notes
        ]
    },
    {           // TRANSACTION SECTION OF PAGE
        "ID" : "Transactions",
        "Label" : "Transactions",
        . . .
        . . .
        "Controls" : [
            // list of controls for transactions
        ]
    },
    {           // FEES SECTION OF PAGE
        "ID" : "Fees",
        "Label" : "Fees",
        . . .
        . . .
        "Controls" : [
            // list of controls for fees
        ]
] // END OF SECTION BLOCK
```

In particular embodiments, sections may include section attributes. For example, section attributes may include:

ID: section identifier

Label: label for section; may be displayed on screen

Collapsible: indicator that section may be minimized

Enabled: master flag to enable/disable section and all child controls within section Visible: indicator whether section is currently visible on screen Readonly: master flag to enable/disable editing section and all child controls within section Required: denotes a section required to return data In particular embodiments, sections may include "Controls." Controls may refer to any user interface components for data input/output. Client application 112 may be operable to parse SDML and render a library of standard or known screen controls. Client application 112 may present the data in any suitable format according to the requirements of the particular application. For example, client application 112 may present a list of selectable items as a drop down list or a collection of checkboxes. In particular embodiments, controls may define interaction requirements while the on-screen implementation details may be determined by client application 112. In particular embodiments, controls may (a) support configuration for specific business application purposes (e.g., select, last valid, start date, end date, maximum count, etc.); (b) support rendering themselves with previously entered values; (c) support nested controls (i.e., controls may contain other controls); and (d) any other suitable user interface capabilities. In particular embodiments, example controls may include:

Label: display Text

TextBox: enable text editing

DateTimeSelect: enable selection of date and/or time

ListGroup: enable display and selection of a list of items

SelectGroup: enable display and selection of a group of items

Action: triggers some action

Hyperlink: activates a hyperlink

DataGrid: enable display and selection of multiple items in tabular format

Controls may include control attributes. In particular embodiments, SDML controls may comprise attributes similar to JavaScript screen element attributes. For example, control attributes may include:

| Attribute | Type | Default | Description |
| --- | --- | --- | --- |
| ID | String | — | Identifier for screen object |
| value | String | — | Text value used where needed (e.g., simple text or header) |
| label | String | — | Label displayed on control |
| description | String | — | Supplemental context info. May be used for ADA requirements |
| enabled | Boolean | true | Sets "grayed out" appearance |
| visible | Boolean | true | Sets visibility of control |
| readonly | Boolean | false | Sets read only behavior |
| selectmode | String | none | Controls select types (none, single, multi, date, time, datetime) |
| required | Boolean | false | Requires data for any input control |
| errormsg | String | — | Contains error message if applicable |
| showID | String[ ] | — | Handle to other object/control/section to show when set |
| selected | Boolean | false | Determines if object is current selection (may be applied to child in collection) |
| Datatype | String | text | Text, number, date, boolean, datetime, time, HTML, URL, etc. |

In some embodiments, particular controls may support particular attributes. For example, the following is an example chart of attributes supported by particular controls.

| Attribute | Label | TextBox | DateTimeSelelect | ListGroup | SelectGroup | Action | Hyperlink | DataGrid |
| --- | --- | --- | --- | --- | --- | --- | --- | --- |
| ID | ✓ | ✓ | ✓ | ✓ | ✓ | ✓ | ✓ | ✓ |
| value | | ✓ | ✓ | | | | | |
| label | ✓ | ✓ | ✓ | ✓ | ✓ | ✓ | ✓ | ✓ |

-continued

| Attribute | Label | TextBox | DateTimeSelelect | ListGroup | SelectGroup | Action | Hyperlink | DataGrid |
|---|---|---|---|---|---|---|---|---|
| description | ✓ | ✓ | ✓ | ✓ | ✓ | ✓ | ✓ | ✓ |
| enabled | ✓ | ✓ | ✓ | ✓ | ✓ | ✓ | ✓ | ✓ |
| visible | ✓ | ✓ | ✓ | ✓ | ✓ | ✓ | ✓ | ✓ |
| readonly | | ✓ | ✓ | ✓ | ✓ | | | ✓ |
| selectmode | | ✓ | ✓ | | | | | ✓ |
| showID | ✓ | ✓ | ✓ | ✓ | ✓ | ✓ | ✓ | ✓ |
| required | ✓ | ✓ | ✓ | ✓ | ✓ | | ✓ | |
| selected | | | | ✓ | ✓ | | | ✓ |
| errormsg | ✓ | ✓ | ✓ | ✓ | ✓ | ✓ | ✓ | ✓ |
| datatype | ✓ | ✓ | ✓ | ✓ | ✓ | ✓ | ✓ | |

In particular embodiments, the "showID" attribute comprises an array of control logic for displaying or hiding other screen elements. ShowId may be implemented as a Boolean function. A Boolean implementation may be applicable for checking or unchecking certain types of behavior. For example, checking a single checkbox may then display a textbox, such as a disclosure text or disclaimer text. In particular embodiments, a showId array may be attached to a ListGroup or SelectGroup.

In particular embodiments, showId may be implemented as a compare function. A compare implementation, for example, may be applicable for evaluating numerical values. Example comparison operands may include greater than (GT), greater than or equal (GTE), less than (LT), less than or equal (LTE), equal (EQ), null or empty (N), and not null or not empty (NN). These operands may be supported by two attributes:

EvalOperator: one of the operands GT(E), LT(E), EQ, N, or NN
EvalOperand: value to be compared against (e.g., TextBox.value>14)

An example showId attribute is shown as part of a TextBox control in the following example SDML.

```
"TextBox": [
{
    "ID": "TB_TA1",
    "value": "72.00",
    "showID": [
        { "ID": "RG_RA1A", "EvalOperator": "GT", "EvalOperand":
        "25.00" },        // (TB_TA1.value > 25.00)
        { "ID": "RG_SA1B", "EvalOperator": "LTE", "EvalOperand":
        "25.00" },        // (TB_TA1.value <= 25.00)
    ]
},
}
```

Response SDML format. For particular controls, the API may define a Response format but not a Request format. For example, in a particular embodiment a Label control may be read only. Workflow engine 110 may send a GetNextScreen Response to client application 112 that contains a read only Label control. Client application 112 may display the label text to user 116, but user 116 cannot interact with the label. Thus, no data exists for client application 112 to send back to workflow engine 110 in the next GetNextScreen Request. In such a scenario, the API may define a Label SDML structure for a Response message but not a Request message.

In particular embodiments, the controls described above may be represented by the example SDML below.

Label:

Label may display text such as headers, identifiers, instructions, etc. Note that a Label control is different than the label attribute described above, which can be an attribute of many different controls. In particular embodiments, Label is a read only control. The following is an example SDML format of a Label Response.

```
{
    "ID" : "PCRAmount",
    "Control" : "Label",
    "value" : "230.42",
    "DataType" : "Double",
    "enabled" : false
}
```

In particular embodiments, Label may support text formatting commands such as HTML commands (e.g., <BR>, <B>, <P>, <DIV>, <UL>, <LI>, <I>, etc.). In such a scenario the DataType attribute may be set to "HTML." The following is an example SDML format of a Label Response including text formatting commands.

```
{
    "ID" : "DrinkMenu",
    "Control" : "Label",
    "value" :
    "<b>DRINKS</b><ul><li>Coffee</li><li>Milk</li><li>Tea</li><li>Water</li></ul>",
    "DataType" : "HTML"
}
```

In particular embodiments, the API may represent a control by two different SDML formats. One SDML format may represent a GetNextScreen Request format and the second may represent a GetNextScreen Response format. In other words, each control may have both a Request and TextBox:

TextBox may display text and enable users to edit text. The following is an example SDML format of a TextBox Response.

```
{
    "ID" : "PCRAmount",
    "label" : "PCR Amount",
    "value" : "230.42",
    "Control" : "TextBox",
    "multiline" : false,
    "DataType" : "Double",
    "enabled" : false
}
```

The following is an example SDML format of a multi-line TextBox Response.

```
{
    "ID" : "PoliceNote",
    "label" : "Policia Notes",
    "value" : "Suspect was known to victim. Last seen running down 3rd street...",
    "Control" : "TextBox",
    "multiline" : true,
    "DataType" : "text",
    "enabled" : false
}
```

In particular embodiments, the TextBox Request message may contain a single key-value pair and the user data may be contained in the "PostData" array. The following is an example SDML format of a TextBox Request.

```
{
    "PostData": [
        { "ID":"PCRAmount",
          "value" : "$238.22"
        }
    ]
}
```

The following is an example SDML format of a multi-line TextBox Request.

```
{
    "PostData": [
        {
            "ID":" PoliceNote",
            "value" : "Suspect was NOT known to victim. Last seen running down 4th street."
        }
    ]
}
```

DateTimeSelect:

DateTimeSelect may enable a user to select a date and/or time. The following is an example SDML format of a DateTimeSelect Response.

```
{
    "ID" : "TransactionDate",
    "label" : "Transaction Date",
    "value" : "04/14/2014",
    "Control" : "DateTimeSelect",
    "DataType" : "Date",
    "enabled" : true,
    "readonly" : false
}
```

In particular embodiments, the DateTimeSelect Request message may contain a single key-value pair and the user data may be contained in the "PostData" array. The following is an example SDML format of a DateTimeSelect Request.

```
{
    "PostData": [
        {
            "ID" : "TransactionDate",
            "value" : "04/09/2013"
        }
    ]
}
```

ListGroup:

ListGroup may enable a user to view and select items from a list. In particular embodiments, ListGroup may include a group ID and item IDs. For example, ListGroup may comprise the ID "State" with item IDs for individual states, such as "PA", "NJ", etc. The following are example SDML formats of a ListGroup Response.

```
{
    "ID" : "State",
    "label" : "State",
    "Control": "ListGroup",
    "description": "a group of states from which a user may select current residence",
    "selectMode" : "single",
    "nullText" : "Select...",
    "required" : true,
    "invalidValues" : [ ],
    "validValues" : [
        { "ID" : "PA", "value" : "Pennsylvania", "selected" : true },
        { "ID" : "NJ", "value" : "New Jersey" },
        { "ID" : "DE", "value" : "Delaware" }
    ]
}
{
    "ID" : "3WayCallAttempted",
    "label" : "Three Way Call",
    "Control": "ListGroup",
    "selectMode" : "multi",
    "required" : true,
    "invalidValues" : [ ],
    "validValues" : [
        { "ID" : "NA", "value" : "Not Applicable", "selected" : true },
        { "ID" : "3WayOK", "value" : "3-Way Call Successful" },
        { "ID" : "3WayFail", "value" : "3-Way Call Not Successful" }
    ]
}
```

In particular embodiments, the ListGroup Request may return attributes indicating the selected state (true or false) for each item in the list. The following are example SDML formats of a ListGroup Request.

```
{
    "PostData": [
        {
            "ID": "State",
            "value": [
                { "ID" : "PA", "selected" : true },
                { "ID" : "NJ", "selected" : false },
                { "ID" : "DE", "selected" : true }
            ]
        }
    ]
}
{
    "PostData": [
```

-continued

```
{
    "ID" : "3WayCallAttempted",
    "value" : [
        { "ID" : "NA", "selected" : true },
        { "ID" : "3WayOK"", "selected" : false },
        { "ID" : "3WayFail", "selected" : true }
    ]
}
}
```

SelectGroup:

SelectGroup may enable a user to view and select items from a group. The following are example SDML formats of a SelectGroup Response.

```
{
    "ID" : "3WayCallAttempted",
    "label": "Select Group",
    "Control": "SelectGroup",
    "selectMode" : "single",
    "nullText" : "",
    "required" : true,
    "invalidValues" : [ ],
    "validValues" : [
        { "ID" : "NA", "value" : "Not Applicable", "selected" : true },
        { "ID" : "3WayOK", "value" : "3-Way Call Successful" },
        { "ID" : "3WayFail", "value" : "3-Way Call Not Successful" }
    ]
}
{
    "ID" : "ContactOptions",
    "label" : "Contact Options",
    "Control": "SelectGroup",
    "selectMode" : "multi",
    "required" : true,
    "invalidValues" : [ ], // optional
    "validValues" : [
        { "ID" : "Home", "value" : "Home" },
        { "ID" : "Work", "value" : "Work", "selected" : true },
        { "ID" : "Mobile", "value" : "Mobile" },
    ]
}
```

The following are example SDML formats of a SelectGroup Request.

```
{
    "PostData": [
        {
            "ID": "3WayCallAttempted",
            value: [
                { "ID" : "NA", "selected" : true },
                { "ID" : "3WayOK"", "selected" : false },
                { "ID" : "3WayFail", "selected" : true }
            ]
        }
    ]
}
{
    "PostData": [
        {
            "ID": "ContactOptions",
            "value": [
                { "ID" : "Home", "selected" : false},
                { "ID" : "Work", "selected" : true },
                { "ID" : "Mobile", "selected" : false },
                { "ID" : "Email", "selected" : true }
            ]
        }
    ]
}
```

Action:

Action may enable a user to trigger some action. In particular embodiments, the triggered action may be outside the normal workflow. The following is an example SDML format of an Action Response.

```
{
    "ID" : "DupDetails",
    "label" : "Review Duplicates",
    "value" : "FULL URL TO Rest Service for this ACTION",
    "Control" : "Action", "DataType" : "URL", "enabled" : false
}
```

Hyperlink:

Hyperlink may display a hyperlink. The following is an example SDML format of Hyperlink Response.

```
{
    "ID" : "ViewAccountDetails",
    "label" : "Accounts",
    "value" : "URL to user's accounts",
    "Control" : "Hyperlink", "DataType" : "URL", "enabled" : true
}
```

DataGrid:

DataGrid may enable display, selection, and/or modification of tabular data. The following is an example SDML format of a DataGrid Response with four columns of data that supports selection of multiple transactions and editing of the TransactionDate and Amount.

```
{   // sample grid with two editable fields
    "ID" : "DemoGrid",
    "Control": "DataGrid",
    "select" : "multi",
    "Columns": [
        { "ID": "TransactionID", "value" : "TransactionID"},
        { "ID": "TransactionDate", "value" : "Transaction Date" },
        { "ID": "Amount", "value": "Amount" },
        { "ID": "Website", "value": "Website" }
    ],
    "Rows" : [
        {
            "ID" : "INTERNAL_INDEX_002",
            "enabled" : true,
            "selected" : true,
            "Controls" : [
                { "Control": "Label", "value": "823288237623"},
                { "Control": "TextArea", "DataType": "String", "value": "03/02/2014", "readonly" : false},
                { "Control": "TextArea", "DataType": "String", "value": "$238.22", "readonly" : false},
                { "Control": "Input", "DataType": "URL", "value": "www.companymart.com", "readonly" : true},
            ]
        },
        [
            "ID" : "INTERNAL_INDEX_006",
            "enabled" : false,
            "selected" : false,
            "Controls" : [
                {"Control": "Label", "value": "723623662362"},
                {"Control": "TextArea": "DataType": "String", "value": "03/07/2014", "readonly" : false},
                {"Control": "TextArea", "DataType": "String", "value": "$43.66", "readonly" : false},
                {"Control": "Input", "DataType": "URL", "value": "www.companymart.com", "readonly" : true},
            ]
        }
    ]
}
```

The following is an example SDML format of a DataGrid Request. Elements of the grid may be defined by Row [currRowIndex].ID+Column[currColIndex].ID) (e.g., INTERNAL_INDEX_006.TransactionDate above).

```
{              // sample grid data with two editable fields
   "PostData": [
   {
      "ID":"INTERNAL_INDEX_002",
      "selected" : true,
      "value" : [
         {"ID" : "TransactionDate", "value": "03/02/2014" },
         {"ID" : "Amount", "value": "$238.22" }
      ]
   },
   {
      "ID":"INTERNAL_INDEX_006",
      "selected" : false,
      "value" : [
         {"ID" : "TransactionDate", "value": "03/07/2014" },
         {"ID" : "Amount", "value": "$43.66" }
      ]
   }
   ]
}
```

While the preceding examples are shown in JSON format, one of ordinary skill would understand that XML or any other suitable language may be used to describe the SDML format. Additionally, although examples of particular screen controls and attributes are described above, one of ordinary skill would understand that additional controls and attributes may be represented in a similar manner.

FIGS. 2A, 2B, 2C and 2D illustrate a flowchart of an example workflow 200, according to a particular embodiment. In particular embodiments, one or more steps of workflow 200 may be performed by components of system 100 of FIG. 1. In this example, the workflow represents a claims processing business application.

The workflow begins at step 202. At step 202, user 116 clicks a "Start Claim" button on a user interface displayed on user device 114. Client application 112 detects the button click at step 204. Client application 112 builds a GetNextScreen Request message setting the MasterCaseID, CurrentScreen, NextScreen, and PostData elements to Null. Client application 112 sends the GetNextScreen Request message to workflow engine 110.

At step 206, workflow engine 110 receives and parses the GetNextScreen Request message. Workflow engine 110 evaluates the data in the GetNextScreen Request message, and based on the business application rules stored in rule storage 124, determines the next user interface screen. In this example, workflow engine 110 determines user 116 is creating a new claim based at least partially on the MasterCaseID, CurrentScreen, NextScreen, and PostData elements in the GetNextScreen Request being Null. Workflow engine 110 creates a new case with an identifier of nnnnn and determines the next step in the case creation workflow is to retrieve information about the customer and the type of claim. More specifically, workflow engine 110 may determine the next screen is ScreenX and that ScreenX will contain, among other elements, data input/output controls to gather a customer name and type of claim. Workflow engine 110 may also determine ScreenX will contain certain navigation controls.

At step 208, workflow engine 110 generates a GetNextScreen Response message via SDML parser/generator 130. The generated GetNextScreen Response message contains a list of SDML Controls which may include TextBox for entering a customer name and ListGroup for selecting a type of claim. ListGroup may include the selection options "Lost Card," "Stolen Card," and "Disputed Transaction." The generated GetNextScreen Response message may also contain a list of SDML Navigation controls which may include navigation options such as "Next," "Previous," "Help," and "Save." Workflow engine 110 sets MasterCaseId to nnnnn and CurrentScreen to ScreenX. Workflow engine 110 sends the generated GetNextScreen Response to client application 112.

At step 210, client application 112, via SDML parser/generator 140, parses the SDML contained in the GetNextScreen Response. Client application 112 determines the current screen to display to user 116 includes TextBox and ListGroup controls. Client application 112, via screen renderer 138, renders a user interface screen containing data input/output controls to gather the customer name and type of claim. In particular embodiments, screen renderer 138 may render ListGroup as a drop down list with three options: "Lost Card," "Stolen Card," and "Disputed Transaction." In particular embodiments, screen renderer 138 may render ListGroup as a group of three radio buttons: one button for "Lost Card," one button for "Stolen Card," and one button for "Disputed Transaction." Screen renderer 138 may also render navigation controls as buttons for "Next," "Previous," "Help," and "Save." While workflow engine 110 may determine what information to display and in what order, client application 112 determines how to display the information.

At step 212, user 116 inputs the requested information into the user interface. In this example, user 116 enters the customer name and selects "Disputed Transaction" as the claim type. User 116 then clicks the "Next" navigation button. Client application 112 collects the information input from user 116, at step 214, and formats another GetNextScreen Request message. This time client application 112 sets MasterCaseID to nnnnn, CurrentScreen to ScreenX, NextScreen to Next, and the PostData array contains the customer information and type of claim information input to the TextBox and ListGroup controls. Client application 112 sends the GetNextScreen Request message to workflow engine 110.

At step 216, workflow engine 110 receives and parses the GetNextScreen Request message. Workflow engine 110 evaluates the data in the GetNextScreen Request message, and based on the business application rules stored in rule storage 124, determines the next user interface screen. In this example, workflow engine 110 determines user 116 is creating a "Disputed Transaction" claim based at least partially on the MasterCaseID, CurrentScreen, and PostData elements in the GetNextScreen Request. Workflow engine 110 also determines the next user interface screen should represent the next step in the case creation workflow based on the NextScreen value of Next. Based on this information (e.g., MasterCaseID, CurrentScreen, NextScreen, PostData) and the application business rules stored in rule storage 124, workflow engine 110 determines the next step in the case creation workflow is to get a narrative description of the disputed transaction. More specifically, workflow engine 110 may determine the next screen is ScreenX+1 and that ScreenX+1 will contain, among other elements, data input/output controls to gather a narrative description of the disputed transaction.

At step 218, workflow engine 110 generates a GetNextScreen Response message. The generated GetNextScreen Response message contains a list of SDML Controls which may include a multiline TextBox for entering a narrative description about the disputed transaction and may include navigation options. Workflow engine 110 sets CurrentScreen to ScreenX+1. Workflow engine 110 sends the generated GetNextScreen Response to client application 112.

At step 220, client application 112 parses the SDML contained in the GetNextScreen Response and renders a user interface screen containing data input/output controls to gather a narrative description of the disputed transaction.

At step 222, user 116 inputs the narrative description of the disputed transaction into the user interface. Instead of clicking "Next" this time, user 116 may click the "Save" navigation button. Client application 112 collects the information input from user 116, at step 224, and formats another GetNextScreen Request message. Client application 112 sets CurrentScreen to ScreenX+1. Based on information in the navigation control element associated with "Save," client application 112 may determine the NextScreen is not simply the next screen in the workflow, but a specific screen. In this example, client application 112 determines and sets NextScreen to ScreenX+3. The PostData array contains the narrative description of the disputed transaction input to the TextBox control. Client application 112 sends the GetNextScreen Request message to workflow engine 110.

At step 226, workflow engine 110 receives and parses the GetNextScreen Request message. Workflow engine 110 determines user 116 wants to perform a save operation based on the NextScreen value of ScreenX+3. Based on the application business rules stored in rule storage 124, workflow engine 110 determines that this particular out-of-order operation is allowed. Workflow engine 110 may determine the next screen is ScreenX+3 and that ScreenX+3 will contain, among other elements, data input/output controls to perform a save operation and navigation controls to complete the save operation.

At step 228, workflow engine 110 generates a GetNextScreen Response message. The generated GetNextScreen Response message contains a list of SDML Controls which may include a TextBox for entering a description of the case to save and a navigation control to indicate "Done." Workflow engine 110 sets CurrentScreen to ScreenX+3 and sends the generated GetNextScreen Response to client application 112.

At step 230, client application 112 parses the SDML contained in the GetNextScreen Response and renders a user interface screen containing data input/output controls to perform a save operation.

At step 232, user 116 inputs information describing the case to save and clicks the "Done" navigation button. Client application 112 collects the information input from user 116, at step 234, and formats another GetNextScreen Request message. Client application 112 sets CurrentScreen to ScreenX+3 and the NextScreen to Next. The PostData array contains the information describing the case to save input to the TextBox control. Client application 112 sends the GetNextScreen Request message to workflow engine 110.

At step 236, workflow engine 110 receives and parses the GetNextScreen Request message. Based on the NextScreen value of Next, workflow engine 110 determines the next screen should represent the next step in the claims processing workflow. Based on the application business rules stored in rule storage 124, workflow engine 110 determines that the next step is to return to ScreenX+1, which was the screen displayed prior to the save operation.

At step 238, workflow engine 110 generates a GetNextScreen Response message with CurrentScreen set to ScreenX+1 and the same controls as described above with reference to ScreenX+1. In this example, the TextBox control may be pre-populated to display the information previously entered by user 116. The GetNextScreen Response may also contain a HyperLink control that links to the customer's account information. Workflow engine 110 sends the generated GetNextScreen Response to client application 112.

At step 240, client application 112 parses the SDML contained in the GetNextScreen Response and renders a user interface screen containing data input/output controls to gather a narrative description of the disputed transaction along with a link to the customer's account information. The data input/output control may already contain information previously entered by user 116.

At step 242, user 116 may edit the narrative description of the disputed transaction. Instead of clicking the "Next" or "Save" navigation buttons, user 116 may desire to update the customer's contact information. User 116 may perform this task by clicking on the link to the customer's account information. The customer account information screen may be referred to as a modal screen because the screen is tangentially related to the claims processing workflow and may be accessed outside the normal workflow at almost any time. Client application 112 collects the information input from user 116, at step 244, and formats another GetNextScreen Request message. Client application 112 sets CurrentScreen to Null and NextScreen to ModalScreenY, which refers to a customer account information screen. Client application 112 sends the GetNextScreen Request message to workflow engine 110.

At step 246, workflow engine 110 receives and parses the GetNextScreen Request message. Based on the NextScreen value of ModalScreenY, workflow engine 110 determines the next screen represents a screen for displaying and editing the customer's account information. Workflow engine 110 determines that this particular out-of-order operation may be allowed based on the application business rules stored in rule storage 124.

At step 248, workflow engine 110 generates a GetNextScreen Response message with CurrentScreen set to ModalScreenY and, among other elements, data input/output controls for updating a customer's contact information and a navigation control to complete the operation. Workflow engine 110 sends the generated GetNextScreen Response to client application 112.

At step 250, client application 112 parses the SDML contained in the GetNextScreen Response and renders a user interface screen for updating a customer's contact information (e.g., phone numbers, email, etc.) along with a navigation control for completing the operation.

At step 252, user 116 may update the customer's contact phone number and click the "Update" navigation button. Client application 112 collects the information input from user 116, at step 254, and formats another GetNextScreen Request message. Client application 112 sets CurrentScreen to Null and NextScreen to ModalScreenY. Client application 112 sends the GetNextScreen Request message to workflow engine 110.

At step 256, workflow engine 110 receives and parses the GetNextScreen Request message. Workflow engine 110 may validate the updated customer contact information. In this example, Workflow engine 110 determines an updated phone number is invalid. Based on the NextScreen value of ModalScreenY and the validation results, workflow engine 110 determines the next screen is still ModalScreenY. Workflow engine 110 updates the contents of ModalScreenY, however, to include an error message.

At step 258, workflow engine 110 generates a GetNextScreen Response message with CurrentScreen set to ModalScreenY and, among other elements, a Label control that displays an error message such as "invalid phone number." Workflow engine 110 sends the generated GetNextScreen Response to client application 112.

At step 260, client application 112 parses the SDML contained in the GetNextScreen Response and renders a user interface screen for updating a customer's contact information along with the error message. In particular embodiments, the contact information may be prepopulated with the customer's contact information prior to the previous erroneous update, or the contact information may be prepopulated with the erroneous information in need of updating.

At step 262, user 116 may correct the customer's contact phone number and click the "Update" navigation button. Client application 112 collects the information input from user 116, at step 264, and formats another GetNextScreen Request message. Client application 112 sets CurrentScreen to Null and NextScreen to ModalScreenY. Client application 112 sends the GetNextScreen Request message to workflow engine 110.

At step 266, workflow engine 110 receives and parses the GetNextScreen Request message. Workflow engine 110 may continue the claims processing workflow in this manner by evaluating the data in the GetNextScreen Request message and based on business application rules stored in rule storage 124, determining the next user interface screen. At some point, workflow engine 110 may determine the workflow is complete.

At step 268, workflow engine 110 generates a GetNextScreen Response message with CurrentScreen set to Screen END. In particular embodiments, the Response may contain controls indicating a case status, a confirmation number, or any other relevant completion information. Workflow engine 110 sends the generated GetNextScreen Response to client application 112.

At step 270, client application 112 parses the SDML contained in the GetNextScreen Response and renders a user interface screen indicating the claim processing workflow is complete. At step 272, user 116 observes the workflow is complete.

The steps of method 200 are given as example combinations of GetNextScreen Requests and Responses. Many of the steps may be performed in any order or repeated where appropriate. Additionally, one of skill in the art will recognize other combinations of steps are possible without departing from the scope of the present disclosure.

Figure 3:
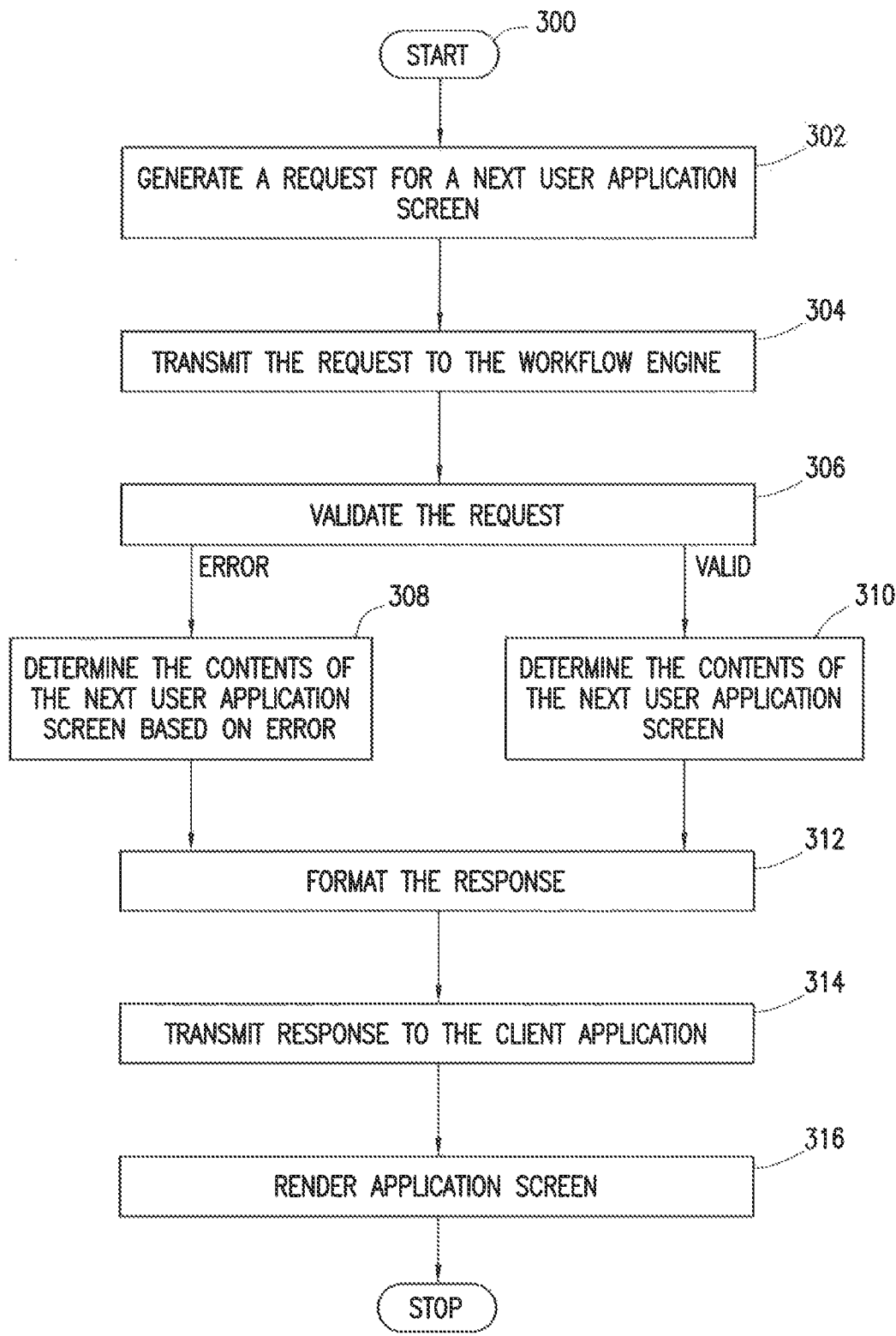
FIG. 3 illustrates a flowchart of an example method for rendering user interface components based on a screen description generated by a workflow engine, according to a particular embodiment.

FIG. 3 illustrates a flowchart of an example method 300 for rendering user interface components based on a screen description generated by a workflow engine, according to a particular embodiment. In particular embodiments, one or more steps of method 300 may be performed by components of system 100 of FIG. 1. In particular embodiments, method 300 may represent a generalized version of the examples illustrated in FIG. 2.

Method 300 begins at step 302 where client application 112 generates a request for a next user application screen. In particular embodiments, the request may comprise one or more of a master case identifier, a current user application screen identifier, a next user application screen identifier, and user data. The master case identifier may identify a particular workflow. The current user application screen identifier may identify an application screen currently displayed to a user and may include null values if no application screen is currently displayed. The next user application screen identifier may identify a next requested application screen to display to the user. In some embodiments, the next user application screen identifier may comprise an explicit identifier or may comprise an identifier relative to a current screen identifier (e.g., next screen or current screen plus some offset). User data may comprise any data collected from the current user application screen. In particular embodiments, the request may comprise SDML represented by JSON, XML, or any suitable language.

At step 304, client application 112 transmits the request for a next user application screen to workflow engine 110. Workflow engine 110 validates the information contained in the request at step 306. In some embodiments, validation comprises evaluating the user data and user application screen identifiers for inconsistent, incorrect, or disallowed values or combinations of values. Validation may be based on application business rules stored in rule storage 124. As an example, workflow engine 110 may validate the format of user data, such as validating that a contact phone number includes the correct number of digits. In particular embodiments, workflow engine 110 may validate whether the next user application screen identifier is a valid request based on the current user application screen identifier and the application business rules stored in rule storage 124. In some embodiments, workflow engine 110 may disallow certain combinations of current user application screen and next user application screen. If workflow engine 110 detects an error, the method continues to step 308.

At step 308, workflow engine 110 determines the user interface contents of the next user application screen based on the type of error determined in the previous step. In particular embodiments, workflow engine 110 may determine the contents of the next user application screen comprise the same contents as the current user application screen and an additional message indicating a cause of the error or describing the error. In particular embodiments, workflow engine 110 may determine the contents of the next user application screen based on the type of error and the business application rules in rule storage 124.

If an error was not detected at step 306, the method continues to step 310. At step 310, workflow engine 110 determines the user interface contents of the next user application screen based on at least one of the current application screen identifier, the next user application screen identifier, the user data, and the business application rules in rule storage 124.

At both steps 308 and 310, the contents of the next user application screen determined by workflow engine 110 comprise data input/output controls and navigation controls that enable user 116 to perform the steps of a particular workflow. In particular embodiments, data input/output controls may include labels, textboxes, date and time selectors, lists, groups, actions, hyperlinks, tables, etc. Navigation controls may include directives such as next, previous, ok, cancel, submit, etc. Particular embodiments may include descriptions of how particular controls should be grouped on the user application screen.

At step 312, workflow engine 110 formats the response describing the user interface contents of the next user application screen. In particular embodiments, the response may comprise SDML represented by JSON, XML, or any suitable language. The SDML may describe screen content and behaviors associated screen controls.

At step 314, workflow engine 110 transmits the response to client application 112. At step 316, client application 112 renders a user application screen according to the contents of the response. A particular of advantage of method 300 is that client applications 112 may remain unaware of the business logic maintained in workflow engine 110. Client applications 112 need only render user application screens in the order, and with the content, determined by workflow engine 110. Thus, client applications 112 may focus on the presentation of data and may remain isolated from changes in business logic.

Figure 4A:
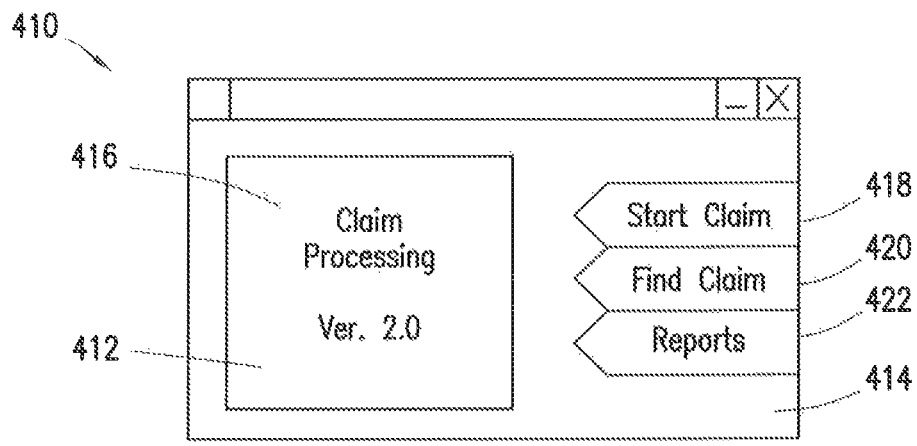
FIGS. 4A, 4B, and 4C illustrate example user interface components, according to a particular embodiment.
Figure 4B:
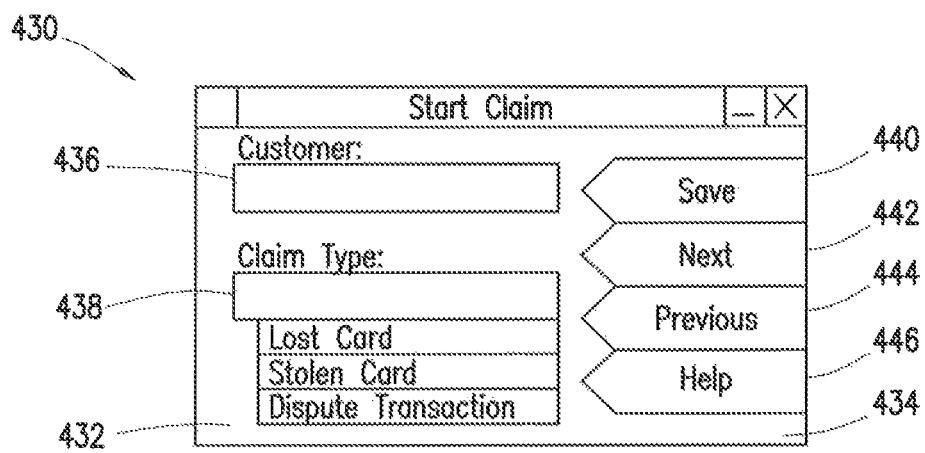
Figure 4C:
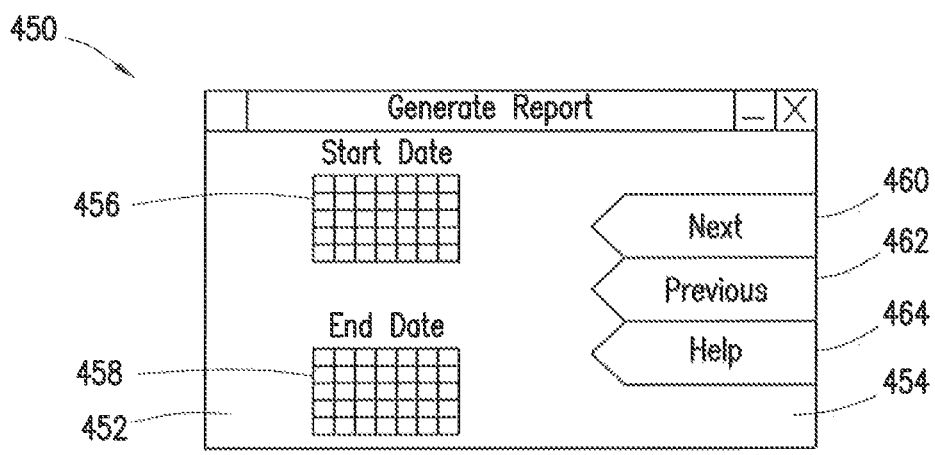

FIGS. 4A, 4B, and 4C illustrate example user interface components, according to a particular embodiment. FIG. 4A illustrates an example user application screen 410 for initiating a claims processing workflow. Screen 410 is divided into section 412 and section 414. Section 412 includes a label control 416. Section 414 controls navigation controls 418, 420, and 422.

Screen 410 may be represented by the following example SDML schema.

```
{
    "MasterCaseID": "0000000001",
    "InteractionID": "838383838", // unique identifier of this call
    "ScreenList" :
    [
        // Array of screens with which to populate navigation tree
    ],
    "CurrentScreen": {
        "Actions": [
            // Array of local action or modal behaviors
        ],
        "Navigation": [
            // Array of navigation actions
            { "ID" : "StartClaim", "value" : "Start", "type" : "submit"
            },
            { "ID" : "FindClaim", "value" : "FindClaim", "type" :
            "submit" }
            { "ID" : "Reports", "value" : "RunReportGenerator",
            "type" : "submit" }
        ],
        "Sections": [
            // Array of sections. Each section may have attributes and a
            controls array
            {
                "ID" : "Section_1",
                "visible" : true,
                "Controls" : [
                    {
                        "ID" : "StartupScreen",
                        "Control" : "Label",
                        "value" : "<b>CLAIM PROCESSING Ver
                        2.0</b>",
                        "DataType" : "HTML"
                    }]
            },
            {
                "ID" : " Section_2",
                "visible" : true,
                "Controls" : [
                    // Array of controls
                ]
            }
        ]
    }
}
```

In particular embodiments, user 116 may click navigation control 418 to initiate a claims processing workflow. Client application 112 may send a GetNextScreen Request to workflow engine 110. Based on the contents of the GetNextScreen Request, workflow engine 110 may send GetNextScreen Response to client application 112 describing the next user application screen. In particular embodiments, FIG. 4B may represent the next user application screen.

FIG. 4B illustrates an example user application screen 430. In particular embodiments, screen 430 may represent the first step in a claims processing workflow. Screen 430 comprises section 432 and section 434. Section 432 comprises data input/output controls 436 and 438. In particular embodiments, control 436 may comprise a TextBox control for receiving a customer name and control 438 may comprise a ListGroup control for selecting a claim type. Section 434 comprises navigation controls 440, 442, 444, and 446.

Screen 430 may be represented by the following example SDML schema.

```
{
    "MasterCaseID": "0000000001",
    "InteractionID": "737373737", // unique identifier of this call
    "ScreenList" :
    [
        // Array of screens with which to populate navigation tree
    ],
    "CurrentScreen": {
        "Actions": [
            // Array of local actions or modal behaviors
        ],
        "Navigation": [
            // Array of navigation actions
            { "ID" : "Save", "value" : "Save", "type" : "submit" },
            { "ID" : "Next", "value" : "Next", "type" : "submit" }
            { "ID" : "Previous", "value" : "Previous", "type" :
            "submit" }
            { "ID" : "Help", "value" : "Help", "type" : "submit" }
        ],
        "Sections": [
            // Array of sections. Each section may have attributes and a
            controls array
            {
                "ID" : "Section_1",
                "visible" : true,
                "Controls" : [
                    {
                        "ID" : "CustomerName",
                        "label" : "Customer Name:",
                        "value" : "",
                        "Control" : "TextBox",
                        "multiline" : false,
                        "DataType" : "text",
                        "enabled" : true
                    }
                    {
                        "ID" : "ClaimType",
                        "label" : "Claim Type:",
                        "Control": "ListGroup",
                        "description": "a list of claim types",
                        "selectMode" : "single",
                        "nullText" : "Select...",
                        "required" : true,
                        "invalidValues" : [ ],
                        "validValues" : [
                            { "ID" : "LC", "value" : "Lost Card",
                            "selected" : true },
                            { "ID" : "SC", "value" : "Stolen Card" },
                            { "ID" : "DT", "value" : "Disputed
                            Transaction" }
                        ]
                    }],
            },
            {
                "ID" : " Section_2",
                "visible" : true,
                "Controls" : [
                    // Array of controls
                ]
            }
        ]
    }
}
```

Returning to FIG. 4A, user 116 may click navigation control 422 to initiate a claims report generation workflow. Client application 112 may send a GetNextScreen Request to workflow engine 110. Based on the contents of the GetNextScreen Request, workflow engine 110 may send GetNextScreen Response to client application 112 describing the next user application screen. In particular embodiments, FIG. 4C may represent the next user application screen.

FIG. 4C illustrates an example user application screen 450. In particular embodiments, screen 450 may represent the first step in a claims report generation workflow. Screen 450 comprises section 452 and section 454. Section 452 comprises data input/output controls 456 and 458. In particular embodiments, control 456 may comprise a DateTimeSelect control for specifying a report starting period and control 438 may comprise a DateTimeSelect control for specifying a report ending period. Section 434 comprises navigation controls 460, 462, and 464.

Screen 450 may be represented by the following example SDML schema.

```
{
    "MasterCaseID": "0000000001",
    "InteractionID": "636363636", // unique identifier of this call
    "ScreenList" :
    [
        // Array of screens with which to populate navigation tree
    ],
    "CurrentScreen": {
        "Actions": [
            // Array of local actions or modal behaviors
        ],
        "Navigation": [
            // Array of navigation actions
            { "ID" : "Next", "value" : "Next", "type" : "submit" }
            { "ID" : "Previous", "value" : "Previous", "type" :
            "submit" }
            { "ID" : "Help", "value" : "Help", "type" : "submit" }
        ],
        "Sections": [
            // Array of sections. Each section may have attributes and a
            controls array
            {
                "ID" : "Section_1",
                "visible" : true;
                "Controls" : [
                    {
                    {
                        "ID" : "ReportStartDate",
                        "label" : "Start Date",
                        "value" : "04/14/2014",
                        "Control" : "DateTimeSelect",
                        "DataType" : "Date",
                        "enabled" : true,
                        "readonly" : false
                    }[
                        "ID" : "ReportEndDate",
                        "label" : "End Date",
                        "value" : "04/14/2014",
                        "Control" : "DateTimeSelect";
                        "DataType" : "Date",
                        "enable" : true,
                        "readonly" : false
                    }]
            },
            {
                "ID" : " Section_2",
                "visible" : true,
                "Controls" : [
                    // Array of controls
                ]
            }
        ]
    }
}
```

Although FIGS. 4A, 4B, and 4C illustrate example user interface components in example configurations, other embodiments may comprise any combination of user interface components in any suitable configuration.

Certain embodiments of the present disclosure may provide one or more technical advantages. For example, decoupling a user interface from application business rules enables a developer to create front end systems that focus on the presentation of data and are not impacted by changes in application business rules. Such front end systems conserve development resources because changes to application business rules may not require changes to each front end system. A technical advantage of one embodiment includes reducing an amount of computing resources used for front end systems because application business logic may be consolidated in the back end system instead of duplicated across multiple front end systems.

Another advantage of the current disclosure is the dynamic nature of the user application screen presentation. Not only is the order and content of screens determined dynamically based on business application rules, but so is the actual layout of the user application screen. For example, traditional systems may have represented a particular workflow with a series of predetermined user interface screens, and even if the data populated in the screens was dynamically determined, the layout and presentation of the screens and screen controls were not. In the present disclosure, everything about the screen presentation may be determined dynamically by the back end workflow engine.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus capable of performing a workflow process, the apparatus comprising:
   a memory operable to store a plurality of application rules, the application rules describing one or more tasks associated with the workflow process; and
   a processor communicably coupled to the memory and operable to repeatedly process a single get next screen request/response interface until the workflow process is complete, wherein the single get next screen request/response interface comprises an application programming interface (API) between a workflow client and the apparatus, and repeatedly processing the single get next screen request/response interface comprises repeating the following steps:
   receive, from the workflow client, a next screen request for a next user application screen, the next screen request comprising a text-based screen descriptor meta language interface that includes a current application screen identifier, a next application screen identifier, and user data;
   determine dynamically, based on the current application screen identifier, the next application screen identifier, the user data, and the plurality of application rules, user interface contents of the next user application screen;
   format a next screen response describing the user interface contents of the next user application screen, the next screen response comprising a text-based screen descriptor meta language interface that includes one or more navigation controls and one or more screen sections, each screen section of the one or more screen sections comprising a related group of input/output controls; and
   transmit the next screen response to the workflow client.

2. The apparatus of claim 1, wherein:
the current application screen identifier is a null value;
the next application screen identifier is a null value; and
the user interface contents of the next user application screen include an application initialization screen.

3. The apparatus of claim 1, wherein:
the current application screen identifier comprises a value N;
the next application screen identifier is a null value; and
the user interface contents of the next user application screen include the next application screen N+1 according to the application rules describing one or more tasks associated with the workflow process.

4. The apparatus of claim 1, wherein:
the processor is further operable to determine, based on the next screen request and the plurality of application rules, that an error has occurred; and
the user interface contents of the next user application screen comprise an error message.

5. The apparatus of claim 1, wherein:
the current application screen identifier comprises a value N;
the next application screen identifier comprises a value X; and
the user interface contents of the next user application screen include a modal screen X.

6. The apparatus of claim 1, wherein:
the screen descriptor meta language is based on one of Java Script Object Notation (JSON) or Extensible Markup Language (XML).

7. The apparatus of claim 1, wherein:
the response describing the user interface contents of the next user application screen describes a screen indicating the workflow process is complete.

8. A method of performing a workflow process, the method comprising repeating a single get next screen request/response interface until the workflow process is complete, wherein the single get next screen request/response interface comprises an application programming interface (API) between a workflow client and a workflow server, and repeating the single get next screen request/response interface comprises repeating the following steps:
receiving, from the workflow client, a next screen request for a next user application screen, the next screen request comprising a text-based screen descriptor meta language interface that includes a current application screen identifier, a next application screen identifier, and user data;
determining dynamically, based on the current application screen identifier, the next application screen identifier, the user data, and a plurality of application rules describing one or more tasks associated with the workflow process, user interface contents of the next user application screen;
formatting a next screen response describing the user interface contents of the next user application screen, the next screen response comprising a text-based screen descriptor meta language interface that includes one or more navigation controls and one or more screen sections, each screen section of the one or more screen sections comprising a related group of input/output controls; and
transmitting the next screen response to the workflow client.

9. The method of claim 8, wherein:
the current application screen identifier is a null value;
the next application screen identifier is a null value; and
the user interface contents of the next user application screen include an application initialization screen.

10. The method of claim 8, wherein:
the current application screen identifier comprises a value N;
the next application screen identifier is a null value; and
the user interface contents of the next user application screen include the next application screen N+1 according to the application rules describing one or more tasks associated with the workflow process.

11. The method of claim 8, further comprising determining, based on the next screen request and the plurality of application rules, that an error has occurred; and
wherein the user interface contents of the next user application screen comprise an error message.

12. The method of claim 8, wherein:
the current application screen identifier comprises a value N;
the next application screen identifier comprises a value X; and
the user interface contents of the next user application screen include a modal screen X.

13. The method of claim 8, wherein:
the screen descriptor meta language is based on one of Java Script Object Notation (JSON) or Extensible Markup Language (XML).

14. The method of claim 8, wherein:
the response describing the user interface contents of the next user application screen describes a screen indicating the workflow process is complete.

15. A system comprising a workflow server and a workflow client communicably coupled by a network and operable to perform a workflow process;
the workflow server comprising:
a memory operable to store a plurality of application rules, the application rules describing one or more tasks associated with the workflow process; and
a processor communicably coupled to the memory;
the workflow client comprising a memory, a processor, and a display;
the processor of the workflow client is-operable to:
generate a next screen request for a next user application screen, the next screen request comprising a text-based screen descriptor meta language interface that includes a current application screen identifier, a next application screen identifier, and user data; and
transmit the next screen request for the user application screen to the workflow server;
the processor of the workflow server is operable to:
receive the next screen request for the next user application screen;
determine dynamically, based on the current application screen identifier, the next application screen identifier, the user data, and the plurality of application rules, user interface contents of the next user application screen;
format a next screen response describing the user interface contents of the next user application screen, the next screen response comprising a text-based screen descriptor meta language interface that includes one or more navigation controls and one or more screen sections, each screen section of the one or more screen sections comprising a related group of input/output controls; and
transmit the response to the workflow client;
the processor of the workflow client is further operable to:
receive the next screen response; and render the next user application screen on the display.

16. The system of claim 15, wherein:
the capability of the processor of the workflow client to render the next user application screen on a display is independent of the application rules.

17. The system of claim 15, wherein:
the workflow client repeatedly transmits next screen requests to the workflow server until the workflow process is complete.

18. The system of claim 15, wherein:
the screen descriptor meta language is based on one of Java Script Object Notation (JSON) or Extensible Markup Language (XML).

* * * * *